United States Patent [19]

Hartwig

[11] 4,073,408
[45] Feb. 14, 1978

[54] APPARATUS FOR MIXING PLASTICS

[75] Inventor: Peter Rudolf Hartwig, Hilchenbach, Germany

[73] Assignee: Schloemann-Siemag Aktiengesellschaft, Dusseldorf, Germany

[21] Appl. No.: 663,870

[22] Filed: Mar. 4, 1976

[30] Foreign Application Priority Data

Apr. 10, 1975 Germany .................. 2515579

[51] Int. Cl.² ........................................... B67D 5/60
[52] U.S. Cl. ................................... 222/145; 222/318; 425/217
[58] Field of Search ............... 222/145, 318, 512, 600; 425/217, 130; 239/124; 403/148, 149, 328, 356, 357; 251/174

[56] References Cited

U.S. PATENT DOCUMENTS

| | | | |
|---|---|---|---|
| 780,680 | 1/1905 | Peterson et al. | 222/145 X |
| 1,286,881 | 12/1918 | Gray | 222/145 X |
| 3,306,495 | 2/1967 | Wabers | 222/318 X |
| 3,558,051 | 1/1971 | Strickler et al. | 222/145 X |
| 3,764,042 | 10/1973 | Shapland et al. | 222/512 X |
| 3,828,821 | 8/1974 | Dotter | 251/174 X |
| 3,975,128 | 8/1976 | Schluter | 425/217 X |
| 3,979,021 | 9/1976 | Reinecke | 222/318 X |

Primary Examiner—Stanley H. Tollberg
Assistant Examiner—Fred A. Silverberg
Attorney, Agent, or Firm—Norman S. Blodgett; Gerry A. Blodgett

[57] ABSTRACT

Apparatus for forming mixture of plastic components having a mixing head to which is attached a storage container for each component and which is equipped with a supply line, a return line, and a displaceable control member, which in one position has two injection openings which are connected to the mixing head by supply lines and in another position has two grooves for connecting the supply lines to the return lines.

4 Claims, 4 Drawing Figures

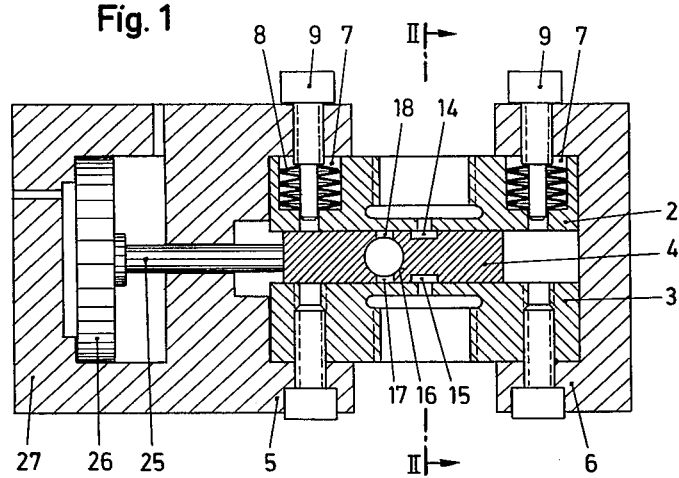
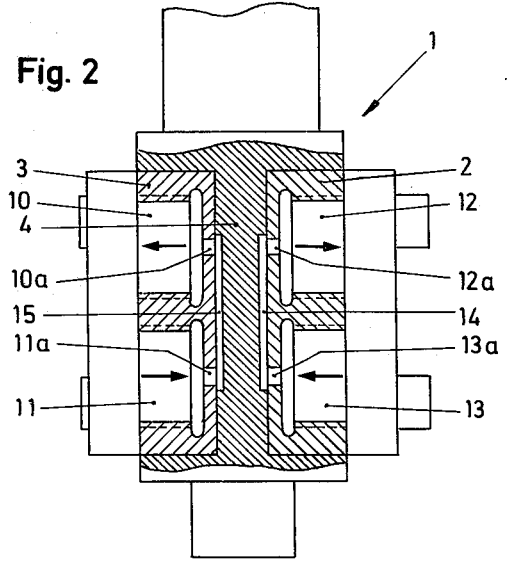

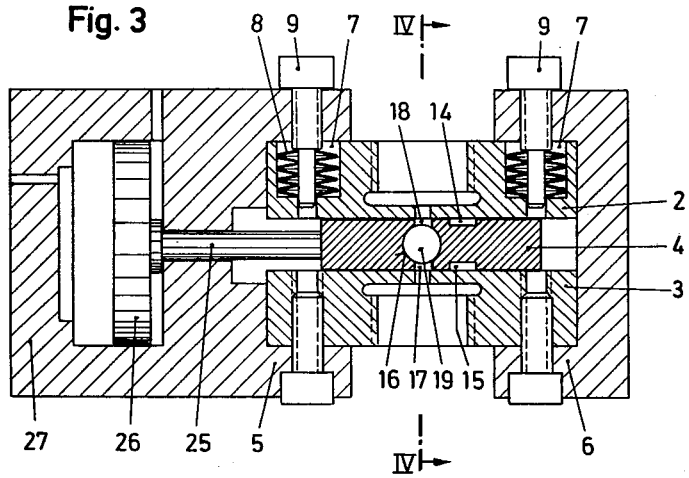
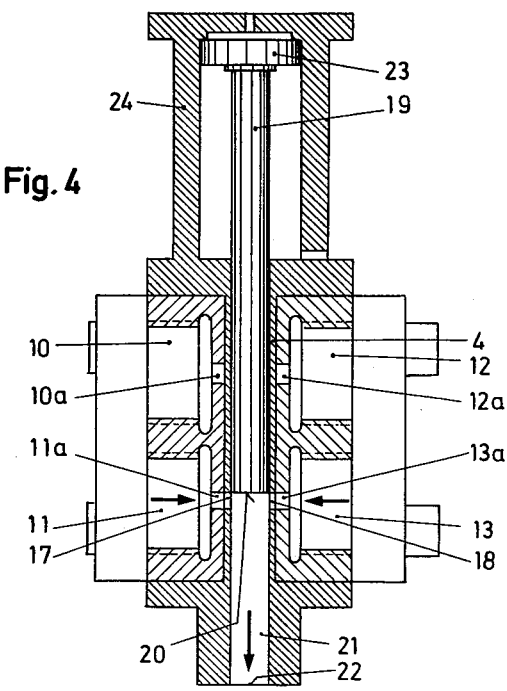

APPARATUS FOR MIXING PLASTICS

BACKGROUND OF THE INVENTION

Apparatus for mixing plastics has been shown in such patents as DT-OS 2,007,935. In this known apparatus, the mixing head has a cylindrical bore in which a control member in the form of a piston is mounted for axial displacement. Because a seal ring would be destroyed by the displacement of the control member on the edges of the injection opening, it is necessary to achieve perfect tightness of the control member within the bore of the mixing head by having the control member fit exactly in the bore. This results in an expensive mixing head. This expenditure is also present if a defective mixing head has to be replaced.

Every mixing head is (due to the design of injection jets with the supply lines for the two plastic components) only suitable for processing two plastic masses within narrow limits.

For example, if the mixing ratio of the two plastic components or the amount of the two plastic components per time unit is varied over certain limits, another mixing head is always required. The mixing of the two plastic components is better, when the distance between the jets is smaller. This distance is predetermined by the size of the control member. The distance is particularly large, when the mixing chamber is incorporated into the control member. The diameter of the control member has to be of such a size that the grooves running parallel in one plane to the mixing chamber may be formed in the control member without weakening it.

It is, therefore, an outstanding object of the invention to provide an apparatus for producing a chemical reaction mixture from two plastic components, so that a perfect tightness of the control member is achieved without special expenditure, while at the same time the mixing of the two plastic components is improved.

Another object of this invention is the provision of apparatus for mixing in which control member is designed in such a way that the control member may be replaced without difficulty and without change of the mixing ratio.

With these and other objects in view, as will be apparent to those skilled in the art, the invention resides in the combination of parts set forth in the specification and covered by the claims appended hereto.

SUMMARY OF THE INVENTION

In general, the present invention consists of providing the mixing head with two plates mounted at a distance from each other and attached to the supply and return line. Between the plates is guided a control member in the mixing chamber so as to be displaceable and also formed in a plate shape. In this design, a play-free tightness of the control member is achieved without a special fitting being necessary. There are only flat plates to work on for making it tight. The individual parts of the mixing head may be exchanged in every way without any additional work.

BRIEF DESCRIPTION OF THE DRAWINGS

The character of the invention, however, may be best understood by reference to one of its structural forms, as illustrated by the accompanying drawings, in which:

FIG. 1 is a vertical sectional view of apparatus including a mixing head constructed in accordance with this invention, the control member being located in a base position.

FIG. 2 is a vertical sectional view of the mixing head taken on the line II—II of FIG. 1, FIG. 3 is similar to FIG. 1, but shows the control member in mixing position, and FIG. 4 is a vertical sectional view of the mixing head taken on the line IV—IV of FIG. 3.

DESCRIPTION OF THE PREFERRED EMBODIMENT

The several figures of the drawings show only the mixing head 1 of this apparatus for producing a chemical reaction mixture from two components. The mixing head 1 in this preferred embodiment is in the form of two plates 2, 3 made the same way, which plates are mounted in spaced relationship, while between the plates 2, 3 is located a control member 4 which is capable of sliding movements. In this design, these plates 2, 3 are connected to each other by two yokes 5, 6 which have a U-shaped cross-section and the plate 3 is tightly screwed to the two yokes 5, 6. The plate 2 has cylindrical recesses 7 into which are inserted several sheet metal springs 8. By means of screws 9 mounted on the yokes 5, 6, the plate springs 8 can be put in compression, so that the plate 2, as well as the plate 3, are pressed resiliently against the control member 4. In each of the plates 2, 3 are arranged at a distance from each other, tapped openings 10, 11, 12, and 13 which serve to receive the pipe lines, not shown in this drawing. The pipe lines which lead to the plates 2, 3 are connected in a known manner to storage containers for the two plastic components. Into the openings 11, 13 are connected the supply lines and the openings 10, 12 remain for the return lines. From the openings 10, 11, 12, and 13 extend channels 10a, 11a, 12a, and 13a, respectively, leading to the surfaces of the control member 4. The surfaces of the control member 4 facing the two plates 2, 3 are each equipped with a groove 14, 15 by which the channel 11a is connected with 10a and channel 13a with channel 12a, as shown in FIGS. 1 and 2. By means of this design, the plastic component may flow through the openings 11, 13 through the grooves 14, 15 to the openings 10, 12 and from there back to the storage containers.

As can be seen in FIGS. 1 and 3 of the drawing, a bore 16 is formed in the control member 4 which is offset from the two grooves 14, 15 and runs parallel to them. The bore 16 extends through the total vertical length of the control member 4. From this bore 16 two channels 17, 18 extend in the radial direction toward the two plates 2, 3. These channels 17, 18 are arranged in such a way that (in the position of control member 4 shown in FIGS. 3 and 4) they line up with the two channels 11a and 13a of the plates 2, 3. Within the bore 16 of the control member 4 is mounted a pusher piston 19 which, in the end position shown in FIG. 4, rests tangentially with its free front area 20 in the vicinity of the channels 17, 18. The free space located in front of the piston 19 within bore 16 forms the so-called "mixing" chamber 21. By means of a free outlet opening 22, the mixing chamber 21 can be connected in a known manner to the hollow cavity of a mold, not shown.

On the upper piston end, which extends out of the control member 4, is fastened a disc-shaped piston 23 which is guided within a cylindrical housing 24, formed integrally with the control member 4. By means of this piston 23, the pusher piston 19 may be displaced within the bore 16 in such a way that the piston 19 fills the mixing chamber 21 completely and the free front area 20 closes the exit opening 22.

For displacement of the control member 4 from the position shown in FIG. 1 into the position shown in FIG. 3, a piston rod 25 engages the control member 4 and is connected at its other end to a piston 26. This piston 26 is slideably mounted in a housing 27, which is designed in this example as integral with the yoke 5. To provide for the displacement of the piston 26 and the piston 23, suitable air pressure lines are attached to the housing 27 and 24 in the conventional manner.

When the control member 4 is in the position shown in FIGS. 1 and 2, the two plastic components flow through the openings 11, 13 and the channels 11a, 13a into the mixing head 1 and are guided back from here through grooves 14, 15, the channels 10a, 12a and the openings 10, 12 back to the storage containers, that is, circulation takes place between the two plastic components. This transport circulation makes it possible to adjust the flow ratios of the two plastic components in exact relationship to each other. The control member 4 is now moved into the position shown in FIGS. 3 and 4 and the circulation is interrupted at that time. The two plastic components now flow through the channels 17, 18 into the mixing chamber 21, are thoroughly mixed there, and pass through the mixing chamber outlet opening 22 into the hollow cavity of the mold. To end the mold-filling procedure, the control member 4 is displaced again, so that the channels 17, 18 are closed and the transport circulation starts again. Now the push-out piston 19 is moved out of the position shown in FIG. 4 and downwardly by a back pressure created in the direction of the outlet opening 22, so that unmixed remnants remain within the chamber 21 and the piston 19 forms a part of the mold surface.

In order to begin the next mold filling cycle, the piston 19 is returned to the position shown in FIG. 4 and thereafter the control member 4 is brought back into position shown in FIGS. 3 and 4.

With this mixing head 1, it is also possible, when necessary, to exchange the control member 4 or one of the two plates 2, 3. If necessary, the grooves 14, 15 and the corresponding channels 17, 18 may be surrounded by a ring-shaped groove for the insertion of a seal ring. Furthermore, it is possible to insert into the two surfaces of the control member 4 discs of hard rubber or plastic in which are formed the grooves 14, 15 and the channels 17, 18. These hard rubber or plastic discs permit the process of at least one plastic component to which has been added short fiberglass fibers.

In a modified version of the above-described design, it is possible to displace the opposing plates 2, 3 relative to each other by means of adjusting screws. In this variation, during switch-over from "circulation" to "mixing", a predetermined advance of a component can be achieved. Such a possible adjustment may be necessary, for instance, when the two components have radically different viscosities or are used in different amounts.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for producing a chemical reactive mixture of two plastic components residing in a first and a second container, comprising:
    (a) a main housing (5) having a cylinder bore in which is slidably mounted a first piston with a first piston rod extending out of the housing,
    (b) a pair of plates (2, 3) fastened to the housing and having spaced parallel facing plane surfaces extending parallel to the axis of the first piston rod,
    (c) a control member 4 fastened to the first piston rod and having opposed parallel planar surfaces which slide between the said facing surfaces, one of the plates being fixedly fastened to the housing, while the other plate is movable laterally of its plane surface, a mixing chamber bore extending through the member with its axis perpendicular to the axis of the first piston,
    (d) resilient means pressing the said other plate toward the said one of the plates, thus clamping the control member firmly, and
    (e) a cylinder integral with the control member with a second piston slidable therein and having a second piston rod slidable in the mixing chamber bore in the member,
    (f) a pair of spaced passages through one of the plates for connection to the first container for providing a first plastic component to the exterior of one of the plates,
    (g) a pair of spaced passages through the other of the plates for connection to the second container for providing a second plastic component to the exterior of the other of the plates,
    (h) a transverse groove on each side of the control member for connecting each pair of passages on occasion, and
    (i) a passage entering each side of the control member and leading to the mixing chamber bore, these passages lining up on occasion with one of each pair of spaced passages.

2. Apparatus as recited in claim 1, wherein the transverse grooves extend parallel to the axis of the mixing chamber bore.

3. Apparatus as recited in claim 1, wherein the said resilient means consists of two stacks of belleville springs.

4. Apparatus as recited in claim 3, wherein two bolts are threaddedly engaged in the main housing with shoulders that engage and compress the stacks of springs.

* * * * *